(12) United States Patent
Wei

(10) Patent No.: US 11,500,133 B2
(45) Date of Patent: Nov. 15, 2022

(54) LENS MODULE AND ELECTRONIC DEVICE

(71) Applicant: AAC Optics Solutions Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 195 days.

(21) Appl. No.: 16/914,363

(22) Filed: Jun. 27, 2020

(65) Prior Publication Data

US 2020/0408966 A1 Dec. 31, 2020

Related U.S. Application Data

(63) Continuation of application No. PCT/CN2019/094102, filed on Jun. 30, 2019.

(51) Int. Cl.
*G02B 7/02* (2021.01)
*G02B 5/00* (2006.01)
*G02B 13/00* (2006.01)

(52) U.S. Cl.
CPC ............. *G02B 5/003* (2013.01); *G02B 7/021* (2013.01); *G02B 13/0045* (2013.01)

(58) Field of Classification Search
CPC .... G02B 5/003; G02B 7/021; G02B 13/0045; G02B 7/022; G02B 2207/123; G02B 13/00; G02B 5/00; G02B 7/02; G03B 11/045; G03B 17/12
See application file for complete search history.

(56) References Cited

U.S. PATENT DOCUMENTS

| | | | | |
|---|---|---|---|---|
| 2007/0291386 A1* | 12/2007 | Yoshikawa | ............ | G02B 1/118 359/885 |
| 2011/0109969 A1* | 5/2011 | Ogasawara | ............ | G02B 7/021 359/601 |
| 2018/0003916 A1* | 1/2018 | Lin | ......................... | G02B 7/021 |
| 2018/0003959 A1* | 1/2018 | Lin | ...................... | G02B 13/004 |
| 2018/0031798 A1* | 2/2018 | Choi | ...................... | G02B 7/021 |
| 2018/0129011 A1* | 5/2018 | Tsai | ....................... | G02B 7/025 |

* cited by examiner

Primary Examiner — Balram T Parbadia
(74) Attorney, Agent, or Firm — W&G Law Group

(57) ABSTRACT

A lens module and an electronic device including the lens module are provided. The lens module includes a lens group and a lens barrel, and the lens group includes a plurality of lenses sequentially arranged from an object side to an image side; the lens barrel comprising an first wall enclosing a receiving cavity for receiving the lens group, and an inner side wall extending from an end of the first wall near the image side away from the lens group, a plurality of first light-extinction grooves arranged in an array are provided on the inner side wall, and each of the first light-extinction grooves extends along an axial direction of the lens barrel.

7 Claims, 6 Drawing Sheets

LENS MODULE AND ELECTRONIC DEVICE

TECHNICAL FIELD

The present invention relates to the field of optical imaging technology and, in particular to, a lens module and an electronic device.

BACKGROUND

With continuous development of technology, portable electronic devices continue to develop towards a direction of intelligence and miniaturization. In addition to digital cameras, portable electronic devices, such as tablet computers and mobile phones, are also equipped with lens modules having a shooting function. The lens module generally includes a lens barrel and a lens group received in the lens barrel, the lens group includes a plurality of lenses. Light incident to the lens group from various angles is likely to form stray light interference on an image side during an imaging process of the lens module, and thus an imaging quality of the lens module is greatly affected.

SUMMARY

An object of the present invention is to provide a lens module for solving the technical problem of a poor imaging quality of the lens module in the related art.

In order to solve the above technical problems, the technical solutions of the present invention are as follows.

A lens module is provided. The lens module includes: a lens group including a plurality of lenses sequentially arranged from an object side to an image side; and a lens barrel comprising an first wall enclosing a receiving cavity for receiving the lens group, and an inner side wall extending from an end of the first wall near the image side away from the lens group. A plurality of first light-extinction grooves arranged in an array is provided on the inner side wall, and each of the plurality of first light-extinction grooves extends along an axial direction of the lens barrel.

In an embodiment, each of the plurality of first light-extinction grooves has a groove width gradually decreasing in a direction facing towards an optical axis of the lens barrel.

In an embodiment, a plurality of first light-extinction ridges spaced in a circumferential direction of the lens barrel protrudes from the inner side wall, and every two adjacent ones of the plurality of first light-extinction ridges define one of the plurality of first light-extinction grooves.

In an embodiment, a cross-section of each of the plurality of first light-extinction ridges is trapezoidal, and a side length of the cross-section of the first light-extinction ridge close to an optical axis of the lens barrel is larger than a side length of the cross-section of the first light-extinction ridge close to the inner side wall.

In an embodiment, each of the plurality of first light-extinction ridges includes an end surface close to an optical axis, two side surfaces extending from two sides of the end surface to the inner side wall of the lens barrel, and both connections between the two side surfaces and the end surface are chamfered.

In an embodiment, a second light-extinction ridge is provided on a surface of each of the plurality of first light-extinction ridges close to an optical axis of the lens barrel, a second light-extinction groove in communication with one of the plurality of first light-extinction grooves is formed between every two adjacent second light-extinction ridges, and the second light-extinction groove is flared in a direction away from the one first light-extinction groove.

In an embodiment, each first light-extinction ridge and the second light-extinction ridge provided thereon are integrally formed as a light-extinction ridge unit, and all light-extinction ridge units are evenly spaced along the circumferential direction of the lens barrel.

In an embodiment, the second light-extinction ridge has a triangular cross-section that is perpendicular to the optical axis.

In an embodiment, a light-extinction pit is formed by recessing from an inner wall surface of each of the plurality of first light-extinction grooves, and/or the inner wall surface of the first light-extinction groove is coated with a light-extinction coating.

An object of the present invention further provides an electronic device, wherein, and the electronic device includes the lens module described above.

The present invention brings at least the following beneficial effects: in one aspect, since the plurality of first light-extinction grooves arranged in an array is defined in the inner side wall corresponding to the receiving cavity and close to the image side, when light propagates in the lens barrel from the object side to the image side, the light will be reflected many times and attenuated after entering the first light-extinction grooves arranged in the array, and is not likely to be reflected to form stray light that interferes with imaging of the lens module, such that the imaging quality of the lens module is improved. In another aspect, since the first light-extinction groove extends along the axial direction of the lens barrel, while the lens group is installed into the receiving cavity of the lens barrel along the axial direction of the lens barrel, the first light-extinction groove extending in the axial direction of the lens barrel will not hinder the installation of the lens group, that is, the imaging quality of the lens module is improved without sacrificing an installation efficiency of the lens group; in still another aspect, since the plurality of first light-extinction grooves arranged in an array is defined on the inner side wall of the lens barrel close to the image side, compared with a relatively smooth inner side wall, the inner side wall provided with the first light-extinction grooves has a larger surface area, which increases a bonding area of an adhesive to be coated on the inner side wall of the lens barrel.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

Figure 1:
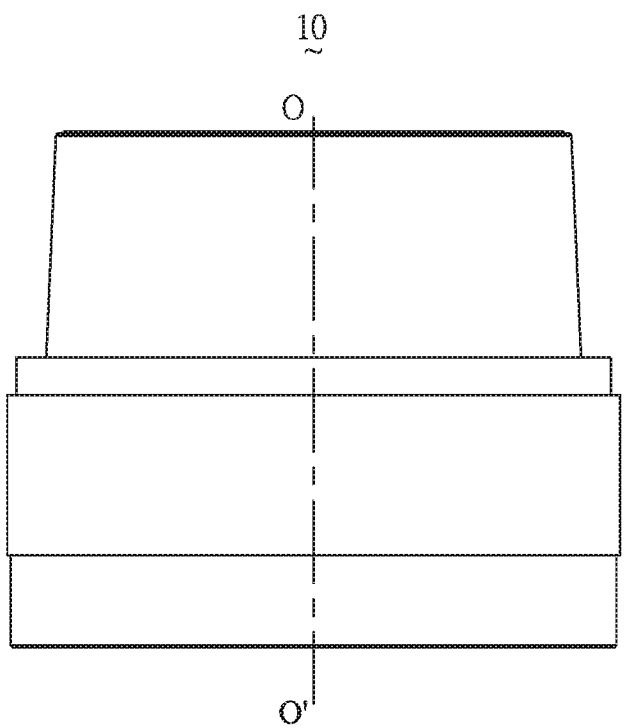
FIG. 1 is a front view of a lens module in an embodiment of the present invention.
Figure 2:
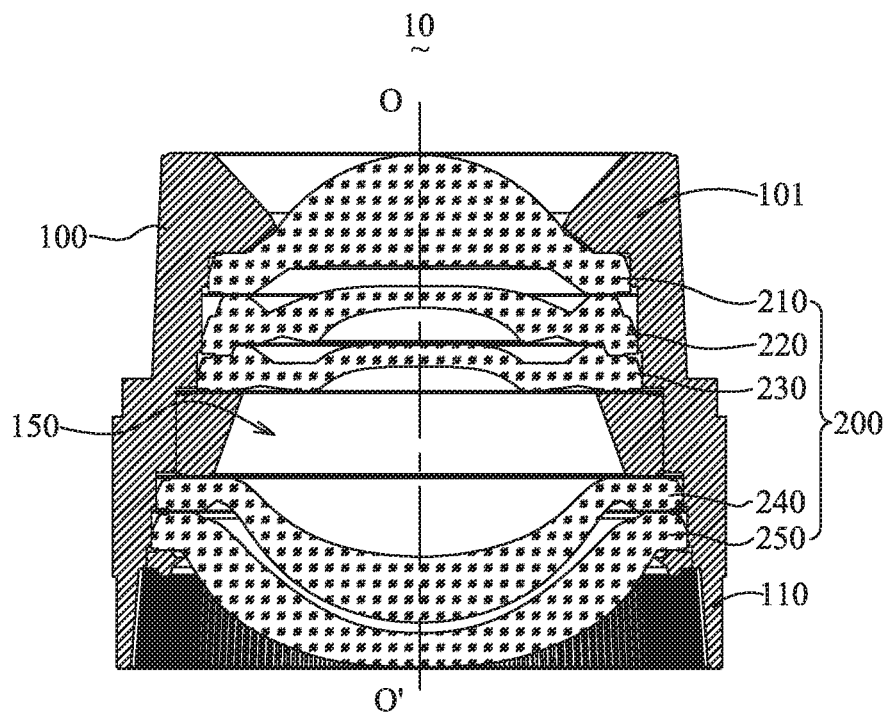
FIG. 2 is a cross-sectional structural schematic diagram of FIG. 1.
Figure 3:
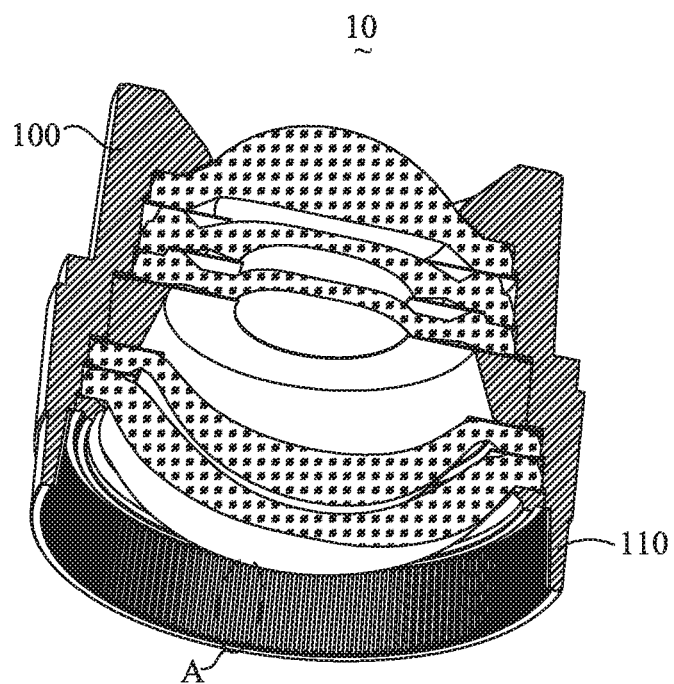
FIG. 3 is a structural schematic diagram of the lens module in FIG. 2 from another perspective.
Figure 4:
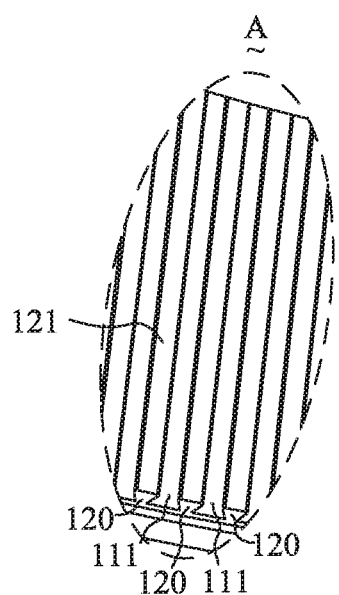
FIG. 4 is a partially enlarged diagram at A in FIG. 3.

The present invention will be further illustrated with reference to the accompanying drawings and the embodiments.

As shown in FIGS. 1 to 10, the present invention provides a lens module 10, and a lens barrel of the lens module 10 is provided with a first light-extinction groove, so that the imaging quality of the lens module 10 is improved.

In an embodiment, as shown in FIGS. 1 to 4, the lens module 10 includes a lens barrel 100 and a lens group 200, the lens group 200 includes a plurality of lenses sequentially arranged from an object side to an image side, and the lens barrel 100 includes an first wall 101 enclosing a receiving cavity 150 for receiving the lens group 200, and an inner side wall 110 extending from an end of the first wall 101 near the image side away from the lens group 200. A plurality of first light-extinction grooves 111 arranged in an array is provided on the inner side wall 110 corresponding to a part of the receiving cavity 150 close to the image side, and each of the first light-extinction grooves 111 extends along an axial direction of the lens barrel 100 (that is, a direction along the optical axis OO').

It can be understood that, since the inner side wall 110 of the receiving cavity 150 close to the image side is provided with the plurality of first light-extinction grooves 111 arranged in an array, when light propagates in the lens barrel 100 from the object side to the image side, the light will be reflected many times after entering the first light-extinction grooves 111 arranged in an array to finally achieve a scattering effect, so as to attenuate the reflection of the light and further weaken interference of stray light on the imaging of the lens module 10. In this way, the imaging quality of the lens module 10 is improved.

Further, since the first light-extinction groove 111 extends along the axial direction of the lens barrel 100 (that is, the direction along the optical axis OO'), while the lens group 200 is installed into the receiving cavity 150 of the lens barrel 100 along the axial direction of the lens barrel 100, the first light-extinction groove 111 extending in the axial direction of the lens barrel 100 will not hinder the installation of the lens group 200. Therefore, the imaging quality of the lens module 10 is improved without sacrificing the installation efficiency of the lens group 200.

Furthermore, since the part of the inner side wall 110 of the lens barrel 100 close to the image side is provided with the plurality of first light-extinction grooves 111 arranged in an array, compared with a relatively smooth inner side wall 110, the inner side wall 110 provided with the first light-extinction grooves 111 has a larger surface area, which increases a bonding area of an adhesive to be coated on the inner side wall 110 of the lens barrel 100.

In an embodiment, considering that the lenses are received in the receiving cavity 150 from the image side to the object side of the lens barrel 100, in order to reduce the installation difficulties of the respective lenses, the lens barrel 100 has a diameter gradually increasing in a direction facing towards the image side, such that the lenses can be easily loaded into the lens barrel 100 through a flared opening on the image side of the lens barrel 100, and thus the mounting efficiency of the lens group 200 can be further improved.

It should be noted that, in the present embodiment, the lens module 10 is a 5P lens module 10. That is, the lens group 200 includes a first lens 210, a second lens 220, a third lens 230, a fourth lens 240, and a fifth lens 250. Designs of the present invention are not limited to this, and in other embodiments, the lens group 200 may include more lenses. Generally, a specific number of the lenses may be selected according to actual needs.

Figure 5:
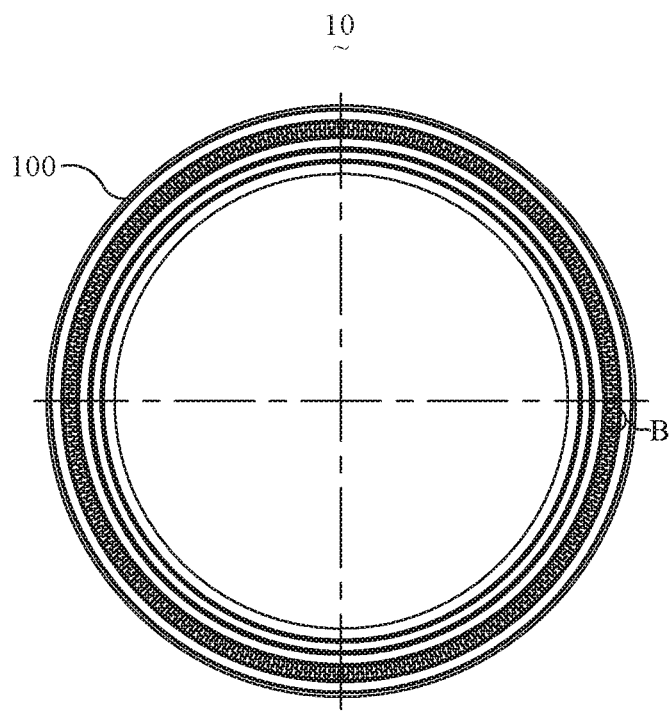
FIG. 5 is a bottom view of the lens module in FIG. 1.
Figure 6:
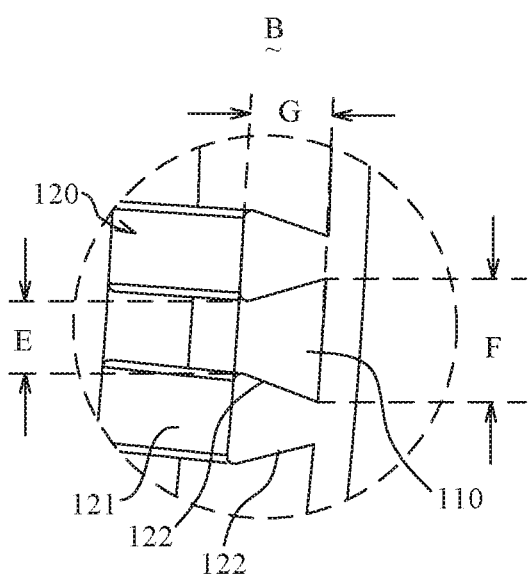
FIG. 6 is a partially enlarged diagram at B in FIG. 5.
Figure 7:
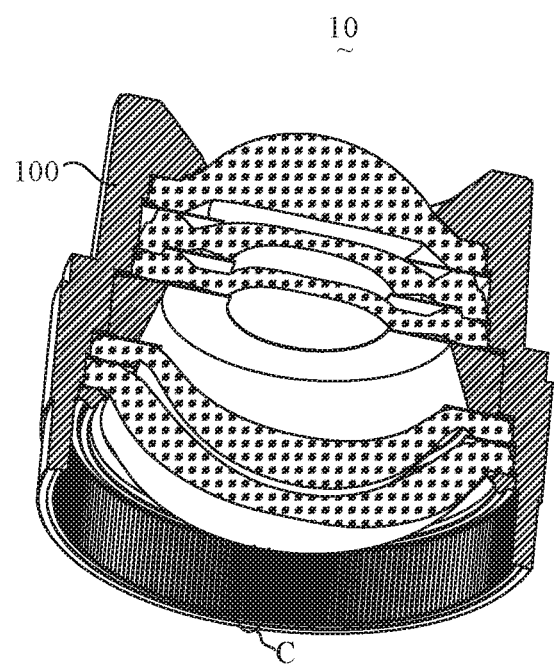
FIG. 7 is a perspective cross-sectional diagram of a lens module in another embodiment of the present invention.
Figure 8:
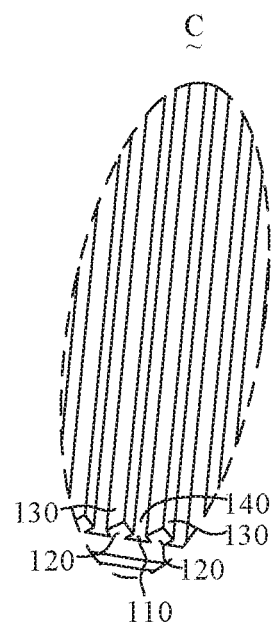
FIG. 8 is a partially enlarged diagram at C in FIG. 7.
Figure 9:
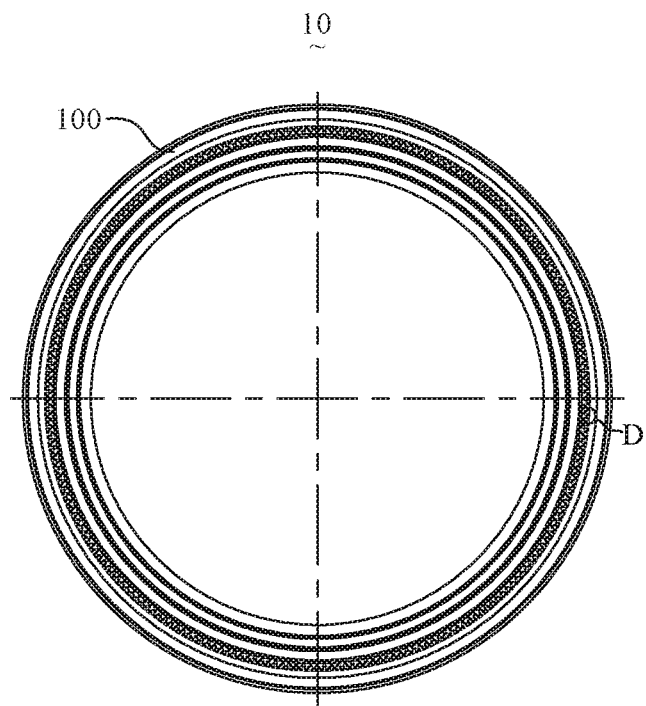
FIG. 9 is a bottom view of a lens module in another embodiment of the present invention.

Further, as shown in FIGS. 1, 5 and 6, in an embodiment of the present invention, in order to improve a light-extinction effect of the first light-extinction groove 111, a groove width of the first light-extinction groove 111 gradually decreases in a direction facing towards the optical axis of the lens barrel 100. In this way, the first light-extinction groove 111 is set in a necking manner, and the light is less likely to be emitted out from a groove opening of the first light-extinction groove 111 after entering the first light-extinction groove 111, and the light incident into the first light-extinction groove 111 can be attenuated after being reflected many times in the first light-extinction groove 111, so that the stray light in the lens barrel 100 can be reduced, and the imaging quality of the lens module 10 can be improved.

Further, as shown in FIGS. 3 to 6, in the present embodiment, the first light-extinction groove 111 is defined by first light-extinction ridges 120 protruding from the inner side wall 110 of the lens barrel 100. For example, a plurality of first light-extinction ridges 120 spaced from one another along a circumferential direction of the lens barrel 100 protrudes from the inner side wall 110, and one first light-extinction groove 111 is formed between every two adjacent first light-extinction ridges 120, i.e., every two adjacent first light-extinction ridges 120 define one first light-extinction groove 111. The design of the present invention is not limited to this, and in other embodiments, the first light-extinction groove 111 may also be formed by directly recessing from the inner side wall 110. In contrast, an overall wall thickness of the lens barrel 100 with the first light-extinction ridge 120 protruding from the inner side wall 110 is larger than an overall wall thickness of the lens barrel 100 with the first light-extinction groove 111 recessing from the inner side wall 110, so structural strength of the lens barrel 100 with the protruding first light-extinction ridge 120 is higher.

Further, as shown in FIG. 6, the shape and structure of the first light-extinction ridge 120 will now be described in detail. In the present embodiment, a cross-section of the first light-extinction ridge 120 is trapezoidal, and a side length of the cross-section of the first light-extinction ridge 120 close to the optical axis of the lens barrel 100 is larger than a side length of the cross-section of the first light-extinction ridge 120 close to the inner side wall 110. For example, the cross-section of the first light-extinction ridge 120 has a substantially isosceles trapezoid shape, the first light-extinction groove 111 is a dovetail groove, and the groove width of the first light-extinction groove 111 decreases in a direction facing towards the optical axis.

Further, in order to avoid the first light-extinction ridge 120 scratching the lens group, in an embodiment of the present invention, as shown in FIG. 6, the first light-extinction ridge 120 has an end surface 121 close to the optical axis, and two side surfaces 122 extending from two sides of the end surface 121 to the inner side wall 110 of the lens barrel 100, and connections between the two side surfaces 122 and the end surface 121 are all chamfered. The first light-extinction ridge 120 is chamfered and thus is less likely to generate burrs. Therefore, during the process of loading the lens into the receiving cavity 150 of the lens barrel 100, even if the lens is in contact with the first light-extinction ridge 120, it is less likely to be scratched by the first light-extinction ridge 120, so clearness of the lens is improved, and the imaging definition of the lens module 10 is improved.

Further, as shown in FIGS. 7 to 10, in another embodiment of the present invention, in order to further weaken the influence of the stray light, a second light-extinction ridge 130 is provided on a surface, close to the optical axis OO' of the lens barrel 100, of each first light-extinction ridge 120, a second light-extinction groove 140 in communication with one first light-extinction groove 111 is formed between every two adjacent second light-extinction ridges 130, and the second light-extinction groove 140 is flared in a direction facing away from the one first light-extinction groove 111. For example, the second light-extinction groove 140 is flared in a direction facing towards the optical axis, and the first light-extinction groove 111 is necked in the direction facing towards the optical axis. In this way, even if more stray light enters the second light-extinction groove 140 and the first light-extinction groove 111, the light entering the first light-extinction groove 111 will be reflected many times and attenuated, stray light that interferes with the imaging of the lens module 10 is less likely to form due to reflection, and therefore, the imaging quality of the lens module 10 can be improved.

Figure 10:
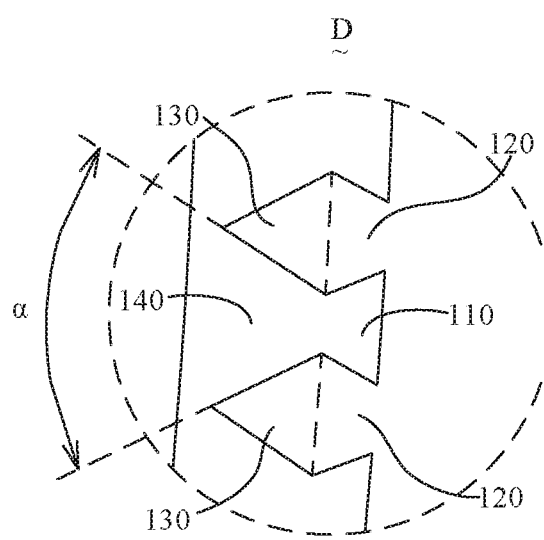
FIG. 10 is a partially enlarged diagram at D in FIG. 9.

In an embodiment, as shown in FIG. 10, the first light-extinction ridge 120 and the second light-extinction ridge 130 provided thereon are integrally formed, and in this way, an overall structural strength of the second light-extinction ridge 130 and the first light-extinction ridge 120 is higher; and each first light-extinction ridge 120 and the second light-extinction ridges 130 formed thereon constitutes one light-extinction ridge unit, and all light-extinction ridge units are evenly spaced along the circumferential direction of the lens barrel 100. In this way, both the second light-extinction grooves 140 and the first light-extinction grooves 111 are evenly spaced along the circumferential direction of the lens barrel 100, thereby providing more uniform light-extinction effect.

In an embodiment, the second light-extinction ridge 130 has a triangular cross-section that is perpendicular to the optical axis OO', and one side of the second light-extinction ridge 130 coincides with a side of the first light-extinction ridge 120 close to the optical axis OO' of the lens barrel 100.

Further, in order to further improve the light-extinction effect of the first light-extinction groove 111, in an embodiment of the present invention, a light-extinction pit is formed by recessing from an inner wall surface of the first light-extinction groove 111, and/or the inner wall surface of the first light-extinction groove 111 is coated with a light-extinction coating (not shown). For example, the light-extinction pits may be formed by a rolling ball hitting the inner wall surface of the first light-extinction groove 111, and the light-extinction coating may be a paint with certain granularity. The present embodiment is intended to increase roughness of the inner wall surface of the first light-extinction groove 111, to further cause diffusing deflection of the light entering the first light-extinction groove 111, so that the light-extinction effect of the first light-extinction groove 111 can be further improved.

Figure 11:
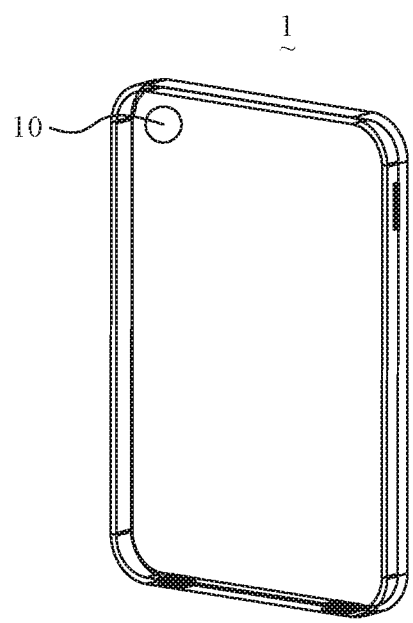
FIG. 11 is a structural schematic diagram of an electronic device in an embodiment of the present invention.

The present invention also provides an electronic device 1, as shown in FIG. 11, the electronic device 1 includes the lens module 10, and the above embodiments can be referred to for a specific structure of the lens module 10. The electronic device 1 using the lens module 10 also has the technical effect as described with respect to the lens module 10, which is not repeated in detail here. It should be noted here that the electronic device 1 may be a mobile phone, a tablet computer, a notebook computer, or the like.

It should be noted that, the above are merely embodiments of the present invention, those skilled in the art can make improvements without departing from the inventive concept of the present invention, however, these improvements shall belong to the protection scope of the present invention.

What is claimed is:

1. A lens module, comprising:
   a lens group comprising a plurality of lenses sequentially arranged from an object side to an image side; and
   a lens barrel comprising an first wall enclosing a receiving cavity for receiving the lens group, and an inner side wall extending from an end of the first wall near the image side away from the lens group,
   wherein a plurality of first light-extinction grooves arranged in an array is provided on the inner side wall, and each of the plurality of first light-extinction grooves extends along an axial direction of the lens barrel;
   each of the plurality of first light-extinction grooves has a groove width gradually decreasing in a direction facing towards an optical axis of the lens barrel; a plurality of first light-extinction ridges spaced in a circumferential direction of the lens barrel protrudes from the inner side wall, and every two adjacent ones of the plurality of first light-extinction ridges define one of the plurality of first light-extinction grooves; each of the plurality of first light-extinction ridges comprises an end surface close to an optical axis, and two side surfaces extending from two sides of the end surface to the inner side wall of the lens barrel, wherein both connections between the two side surfaces and the end surface are chamfered.

2. The lens module as described in claim 1, wherein a cross-section of each of the plurality of first light-extinction ridges is trapezoidal, and a side length of the cross-section of the first light-extinction ridge close to an optical axis of the lens barrel is larger than a side length of the cross-section of the first light-extinction ridge close to the inner side wall.

3. The lens module as described in claim 1, wherein a second light-extinction ridge is provided on a surface of each of the plurality of first light-extinction ridges close to an optical axis of the lens barrel, a second light-extinction groove in communication with one of the plurality of first light-extinction grooves is formed between every two adjacent second light-extinction ridges, and the second light-extinction groove is flared in a direction facing away from the one first light-extinction groove.

4. The lens module as described in claim 3, wherein each first light-extinction ridge and the second light-extinction ridge provided thereon are integrally formed as a light-extinction ridge unit, and all light-extinction ridge units are evenly spaced along the circumferential direction of the lens barrel.

5. The lens module as described in claim 3, wherein the second light-extinction ridge has a triangular cross-section that is perpendicular to the optical axis.

6. The lens module as described in claim 1, wherein a light-extinction pit is formed by recessing from an inner wall surface of each of the plurality of first light-extinction grooves, and/or the inner wall surface of the first light-extinction groove is coated with a light-extinction coating.

7. An electronic device, comprising the lens module as described in claim 1.

\* \* \* \* \*